United States Patent [19]

Platter et al.

[11] Patent Number: 4,555,077

[45] Date of Patent: Nov. 26, 1985

[54] TAPE CARTRIDGE

[75] Inventors: Sanford Platter, Boulder; Charles A. Durand, Aurora; Larry R. Gadsby, Littleton, all of Colo.

[73] Assignee: Electronic Processors, Inc., Englewood, Colo.

[21] Appl. No.: 554,929

[22] Filed: Nov. 25, 1983

[51] Int. Cl.⁴ .......................... G03B 1/04; G11B 15/32
[52] U.S. Cl. .................................... 242/198; 206/389
[58] Field of Search .............................. 242/197–200, 242/195; 360/96.1, 93, 132; 206/389, 409; 220/334–336; 352/72 R, 78

[56] References Cited

U.S. PATENT DOCUMENTS

| | | | |
|---|---|---|---|
| 3,342,431 | 9/1967 | Mouissie | 206/405 X |
| 3,913,145 | 10/1975 | Wiig | 360/132 |
| 3,980,254 | 9/1976 | Coon et al. | 242/195 |
| 4,180,220 | 12/1979 | Shiba et al. | 242/199 |
| 4,212,437 | 7/1980 | Shiba et al. | 242/199 |
| 4,426,047 | 1/1984 | Richard et al. | 242/195 |
| 4,449,677 | 5/1984 | Ohta et al. | 242/199 |

FOREIGN PATENT DOCUMENTS 946106 5/1949 France ............................. 242/198

Primary Examiner—Leonard D. Christian
Attorney, Agent, or Firm—Donald W. Margolis

[57] ABSTRACT

A magnetic tape cartridge is disclosed, which cartridge includes a single rotatably mounted reel. The reel is mounted within the cartridge in a manner which prevents it from rotating until the cartridge is loaded into a tape transport device. Additionally, the reel is mounted within the cartridge so that it is substantially self-centering when loaded into a tape transport device. The cartridge includes a door which is normally closed, but which is automatically opened when the cartridge is inserted into the tape transport device. When the door of the cartridge is opened it provides access to the tape in the cartridge.

2 Claims, 4 Drawing Figures

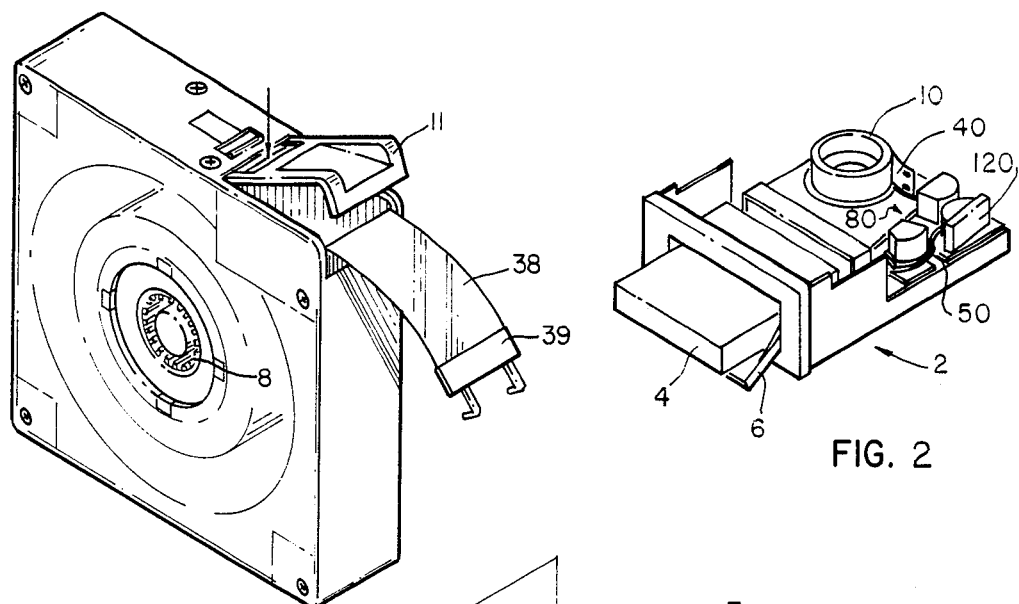
FIG. 1
FIG. 2
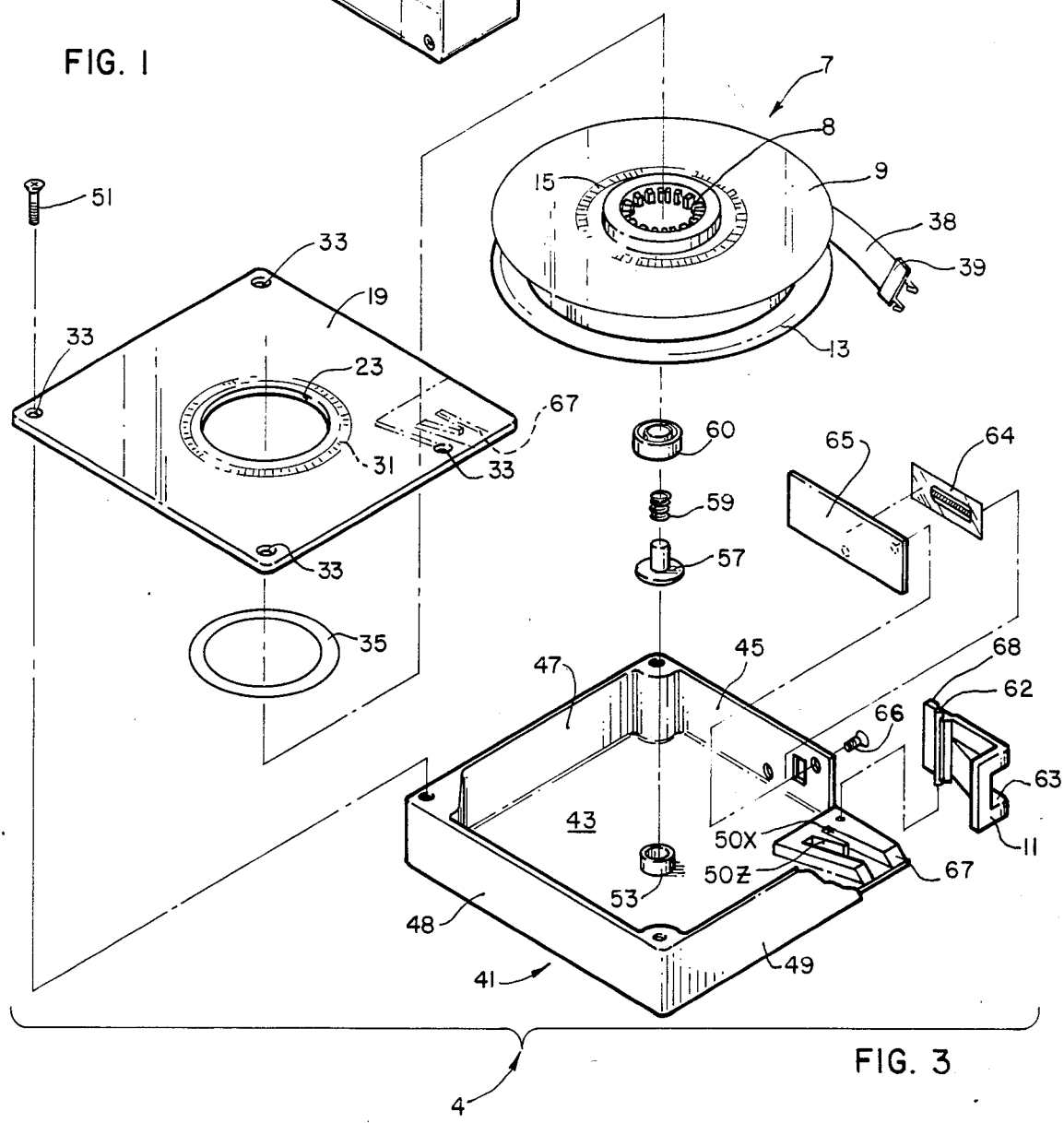
FIG. 3

TAPE CARTRIDGE

SUMMARY OF THE INVENTION

The present invention provides a magnetic tape cartridge which includes a cartridge reel which cannot normally be turned until the cartridge is loaded into a tape transport device. It also provides a cartridge system in which the cartridge reel is self-centering when loaded into the tape transport device. The cartridge includes a door which can be automatically opened to provide access to tape in the cartridge, but otherwise provides a completely sealed tape container.

In the preferred embodiment the cartridge utilizes magnetic tape having a finger device on its end. When such tape is used the cartridge provides a finger device parking area within the cartridge.

These and other objects of the present invention will become apparent to those skilled in the art from the following detailed description, showing the novel construction, combination, and arrangement of parts as herein described, and more particularly defined by the appended claims, it being understood that such changes in the precise embodiments of the herein disclosed invention are meant to be included as come within the scope of the claims except insofar as precluded by the prior art.

BRIEF DESCRIPTION OF THE DRAWINGS

The accompanying drawings illustrate complete preferred embodiments of the present invention according to the best mode presently devised for the particular application of the principles thereof, and in which:

FIG. 1 is a perspective view of the bottom of the cartridge of the present invention in which the cartridge door is open and in which a magnetic tape having a finger assembly on it is extending from the door;

FIG. 2 is a perspective schematic drawing of a tape transport system of the type with which the cartridge of the present may be used;

FIG. 3 is an exploded perspective view of the parts which constitute the cartridge of the present invention.

DETAILED DESCRIPTION OF THE INVENTION

Figure 4:
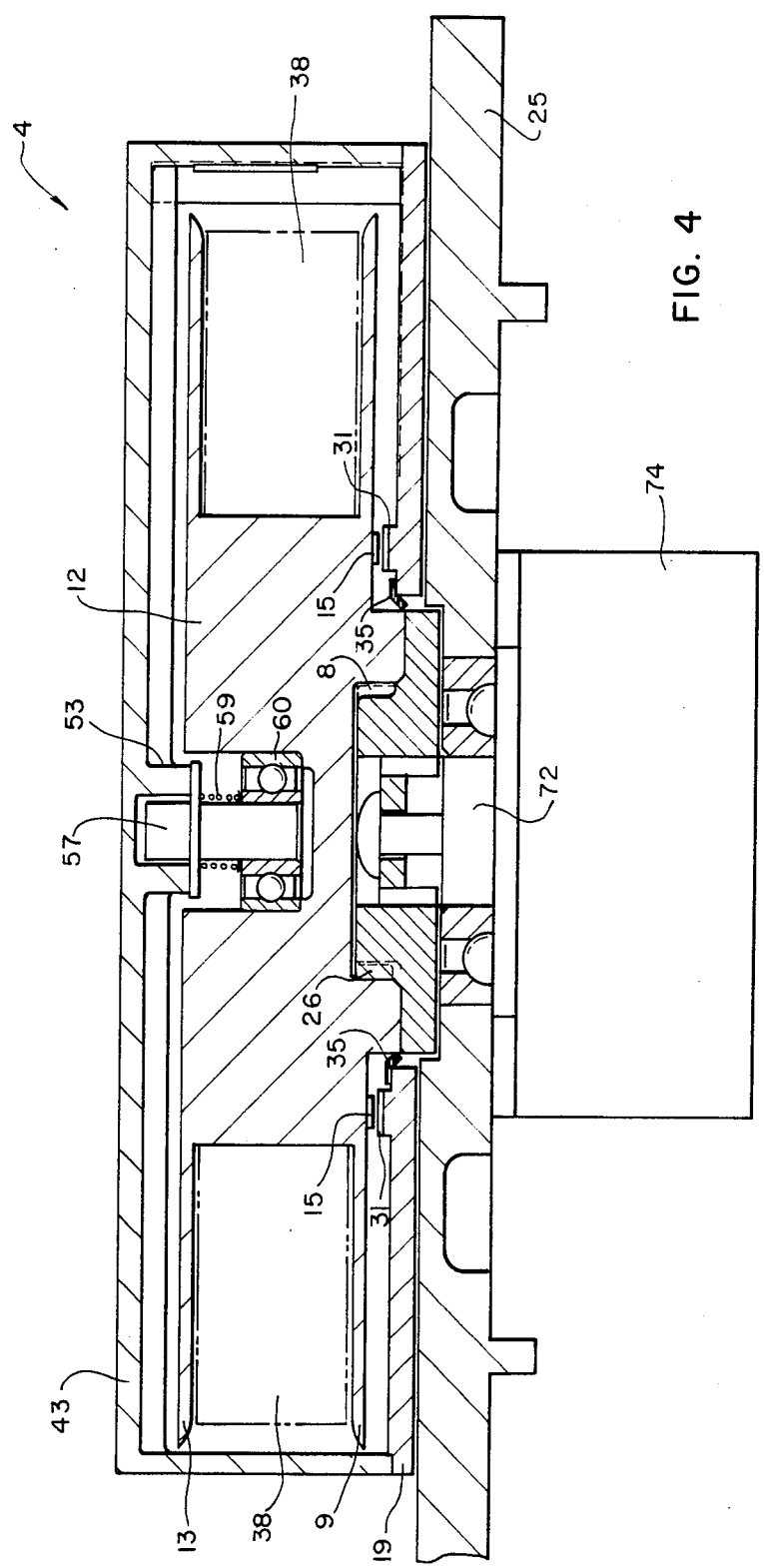
FIG. 4 is a cross-sectional view of the cartridge of the present invention loaded on a driven spline driven spline.

Referring first to FIG. 2, a tape transport system 2 is shown having a cartridge 4 of the present invention being loaded through door 6. When loaded, cartridge 6 will have its door 11 opened, at which time leader 40 extending from take-up hub 10 will advance along threading path 50 between bearing guide assembly 80 and head system 120.

The details of this cartridge loading and automatic tape threading are set forth in substantial additional detail in applications Ser. No. 554,934 entitled "Magnetic Tape Recording and Reproducing System with Automatic Tape Threading" filed herewith, by Sanford S. Platter, et al.

Cartridge 4 includes cartridge reel 7 which carries drive spline 8 on flange 9. Reel flange 13 is connected to flange 9 by a tape winding hub 12. Tape 38 terminating in finger assembly 39 is wound on cartridge reel hub 12 between flanges 9 and 13. Flange 9 also carries a concentric array of clutch teeth 15. Rectalinear cartridge base 19 includes a central opening 23 through which drive spline 8 can extend. Base 19 also includes a concentric array of clutch teeth 31, shown in phantom, in FIG. 3. Teeth arrays 15 and 31 have substantially the same radius and are in stack relationship in the cartridge. Base plate 19 includes a plurality of corner holes 33.

Intermediate reel 7 and base plate 19, at the clutch arrays, is resilient sealer 35. Rectalinear cover 41, including a base 43 and four sidewalls 45, 47, 48 and 49 is provided to receive reel 7 and have base plate 19 connected to it by means of bolts 51 through holes 33. Base 43 includes a centrally open cylindrical boss 53. Intermediate reel 7 and boss 53 there is provided a floating shaft 57, load spring 59 and bearing 60. One end of floating shaft 57 rides loosely within the open end of boss 53 while the other end is snuggly located in bearing 60 (FIG. 4).

Sidewalls 45 and 49 are incomplete and do not intersect at their common corner. This opening is normally closed by door 11 which includes pivot 62 and external ramp 63. Spring 64 is connected to the inner surface of side wall 45 by plate 65 and a portion of spring 64 extends beyond the end of sidewall 45. Tail 68 of door 11 is located external to and overlaps the portion of spring 64 which extends beyond sidewall 45 so that bolts 66 in such a manner that door 11 is normally urged closed. Located on both bases 19 and 43 is a parking ramp 67 including tracks 50X and 50Z for use in parking and locating finger assembly 39.

When cartridge 4 is not mounted on a drive, one end of load spring 59 bears against the rim of floating shaft 57 which in turn bears against boss 53, while the other end of spring 59 bears against bearing 60 which is embedded in hub 12. This urges clutch teeth 15 in flange 9 against clutch teeth 31 in base 19, with the result that reel 7 is immobilized from rotating. Longitudinal pressure on the side of hub 12 opposed to spring 59, for example by pressing on drive spline 8, will separate clutch teeth 15 from clutch teeth 31 and allow free rotation of reel 7.

It is thus seen that the cartridge of the present invention normally provides a closed, sealed and immobolizing housing for reel 7 and magnetic tape 39 wound thereon. In preferred embodiments finger assembly 39 is present and tightly parked in ramp 50X and 50Z in a position which makes it readily accessible for automatic threading.

When being used as a magnetic tape supply, in a transport system cartridge 4 is placed with its drive spline 8 in driving relation with a mating drive spline 26 linked by shaft 72 to motor 74. Then by some mechanism, for example that taught by Platter et al., Ser. No. 554,934, cartridge 4 is forced down against drive spline 26, causing clutch teeth 15 to be disengaged from clutch teeth 31 to allow reel 7 to rotate freely within cartridge 4. This cartridge-reel system also provides self-centering to reel 7, within nominal tolerances, due to the ability of floating shaft 57 to move within the open end of boss 53.

It is thus seen that the present invention teaches a sealed magnetic tape cartridge which includes a protective cartridge reel which cannot normally be turned until the cartridge is loaded into a tape transport device. It also teaches a cartridge system in which the cartridge reel is self-centering when loaded into the tape transport device. The cartridge includes a door which can be automatically opened to provide access to tape in the cartridge, but otherwise provides a completely sealed tape container. In the preferred embodiment taught, the cartridge utilizes magnetic tape having a finger device on its end, which finger device can be tightly parked within the cartridge in a position which makes it accessible for automatic threading.

These and other objects of the present invention will become apparent to those skilled in the art from the following detailed description, showing the novel construction, combination, and arrangement of parts as herein described, and more particularly defined by the appended claims, it being understood that such changes in the precise embodiments of the herein disclosed invention are meant to be included as come within the scope of the claims except insofar as precluded by the prior art.

While the invention has been particularly shown and described with reference to preferred embodiments thereof, it will be understood by those skilled in the art that the foregoing and other modifications or changes in form and details may be made therein without departing from the spirit and scope of the invention as claimed, except as precluded by the prior art.

What is claimed is:

1. A single reel magnetic tape system including in combination:

a cartridge, said cartridge having at least a first and second opposed base, side walls connected between said bases and defining an opening, and a door, said door being mounted at said opening defined by said side walls in a manner which allows it to close said opening or to be swung away from said opening;

a reel, said reel having a first and second spaced apart flange connected by a circular winding hub, one said flange carrying clutch means located on its external surface concentric to said hub;

a floating shaft mounted on one of said cartridge bases to support said reel for rotation of said reel around said shaft;

substantially circular clutch means on said other base said circular clutch means located in stacked registration with said clutch means carried by said reel flange; and means for biasing said clutch means carried by said reel flange and by said base into engagement with one another to prevent rotation of said reel within said cartridge.

2. The cartridge of claim 1 wherein said magnetic tape includes connecting means at its free end, and said cartridge includes means for holding and parking said connecting means adjacent said door in a position so that connection thereto can be made from outside the cartridge when said door is opened.

* * * * *